Figure 1:
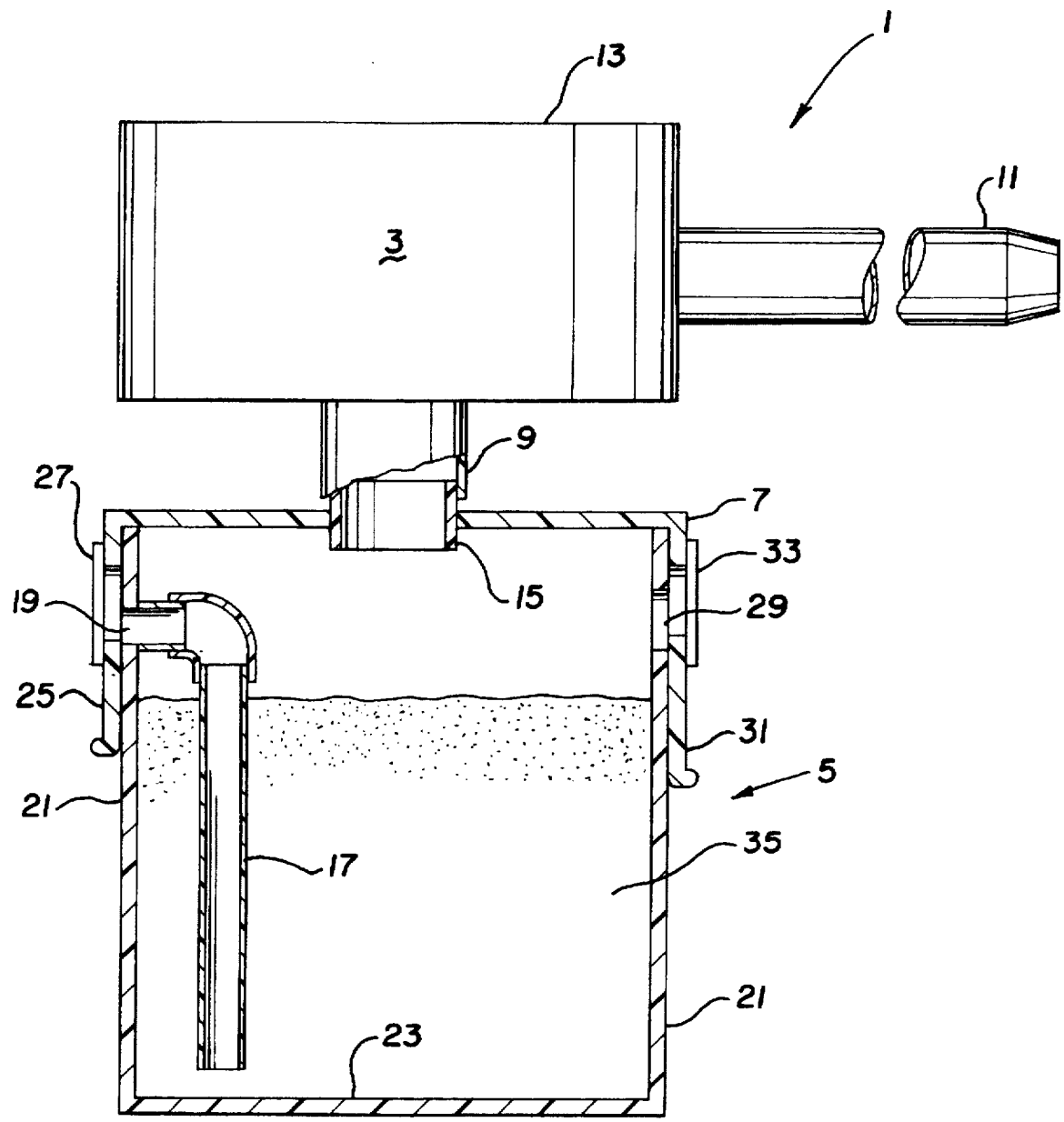
Figure 3:
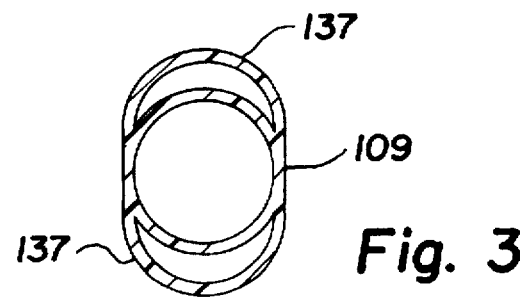
Figure 2:
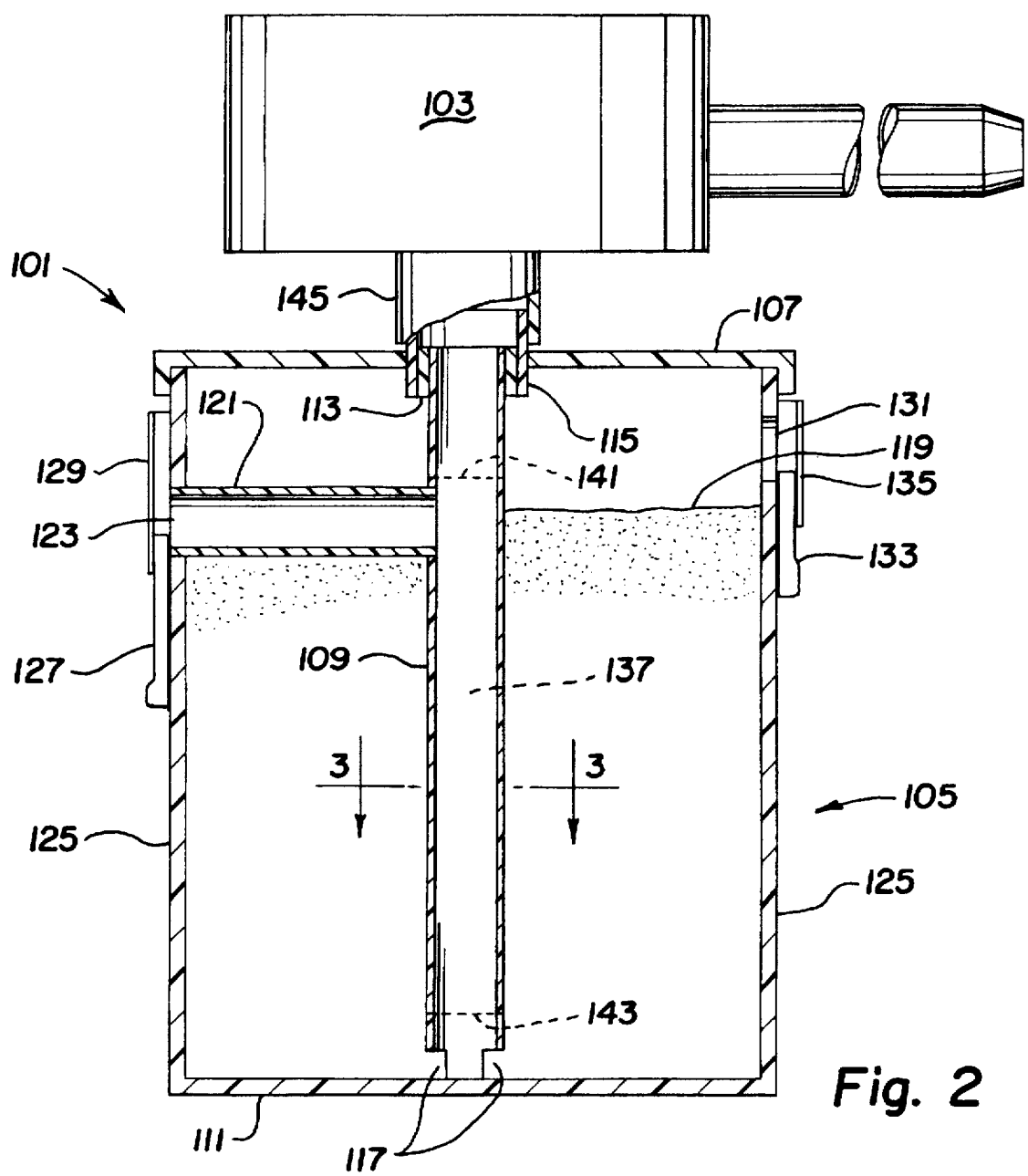

US005779161A

United States Patent [19]
Dvorak

[11] Patent Number: 5,779,161
[45] Date of Patent: Jul. 14, 1998

[54] APPARATUS FOR DISPENSING POWDERED AND GRANULATED MATERIALS

[75] Inventor: Tom Rudy Dvorak, Stringtown, Okla.

[73] Assignee: Tom Dvorak

[21] Appl. No.: 563,320

[22] Filed: Nov. 28, 1995

[51] Int. Cl.[6] ........ A01C 3/06

[52] U.S. Cl. ........ 239/654; 239/143; 239/337; 222/637; 222/394

[58] Field of Search ........ 239/650, 653, 239/654, 302, 337, 339, 340, 346, 373, 143; 222/630, 637, 394

[56] References Cited

U.S. PATENT DOCUMENTS

| | | | |
|---|---|---|---|
| 1,488,125 | 3/1924 | Kline | 222/394 |
| 2,126,924 | 8/1938 | Rose | 239/654 |
| 2,720,270 | 10/1955 | Guise | 222/394 |
| 3,586,215 | 6/1971 | Roche | 222/193 |
| 3,785,568 | 1/1974 | Pfingsten et al. | 239/310 |
| 3,854,634 | 12/1974 | Hart | 222/193 |
| 4,071,170 | 1/1978 | Gunzel, Jr. et al. | 222/193 |
| 4,256,241 | 3/1981 | Mesic | 222/85 |
| 4,474,327 | 10/1984 | Mattson et al. | 239/143 |
| 4,553,698 | 11/1985 | Parker et al. | 239/3 |
| 4,948,013 | 8/1990 | Thomas et al. | 222/1 |
| 5,190,225 | 3/1993 | Williams | 239/653 |
| 5,351,890 | 10/1994 | Clements | 222/143 |
| 5,392,996 | 2/1995 | Ussery | 239/653 |

*Primary Examiner*—Lesley D. Morris
*Assistant Examiner*—Lisa Ann Douglas
*Attorney, Agent, or Firm*—George R. Schultz; Strasburger & Price

[57] ABSTRACT

A simple, inexpensive apparatus for dispensing powdered or granulated material includes a container, a tight-fitting, removable container top, and a conventional blower, such as a leaf blower. The intake of the blower is connected to a container outlet tube. The two described embodiments include arrangements of air inlet orifices, air inlet tubes, and air control doors to control the concentration of the air/material mixture discharged from the blower discharge nozzle.

3 Claims, 2 Drawing Sheets

APPARATUS FOR DISPENSING POWDERED AND GRANULATED MATERIALS

FIELD OF THE INVENTION

The invention relates to dispensing powdered and granulated materials, such as insecticides, fertilizers, and the like. More particularly, the invention relates to an apparatus for dispensing such materials.

BACKGROUND OF THE INVENTION

The prior art includes several patents related to devices for dispensing powdered materials, such as pesticides. U.S. Pat. No. 3,854,634 (Hart) discloses a powder dispenser in which the air from a blower is directed down a tube within a container to be discharged above the top surface of the powdered material contained therein. A plate having a diameter of slightly less than the container is movably disposed within the container above the material. The air from the blower picks up the powder, moves it to the space between the plate and the top of the container, then discharges the air/material mixture through an outlet hole in the top of the container.

U.S. Pat. No. 4,071,170 (Gunzel, Jr. et al.) discloses a dusting apparatus in which powdered material is moved from a hopper into the intake of a blower by the combined effects of gravity, vibration, and the suction of the blower.

In U.S. Pat. No. 4,948,013 (Thomas et al.), a container is divided into upper and lower chambers by a porous media layer. Compressed air entering the lower chamber of the container passes through the porous layer, picks up powdered material in the upper chamber, and is dispensed through an adjustable dip tube.

In U.S. Pat. No. 5,190,225 (Williams), a hopper is fluidly connected to the outlet of a blower by a metering tube. Granular material enters the blower outlet from the hopper through the metering tube and is then discharged from the blower.

In U.S. Pat. No. 5,392,996 (Ussery), a cylindrical container is attached to the intake of a conventional gas or electric powered leaf blower. A pilot tube including an annular plate, the diameter of which is slightly smaller than that of the inside of the container, which rests upon the top of the powdered granular material within the container. The pilot tube is loosely telescoped over a vacuum tube which is in fluid communication with the blower intake. In operation, the material passes between the pilot and vacuum tubes, into the intake of the blower, then out of discharge nozzle of the blower.

Each of the foregoing devices suffers from shortcomings. For example Hart, Gunzel, Jr. et al., Thomas et al., and Williams do not disclose means for adjusting the concentration of the air/material mixture. Although Ussery discloses an adjusting means, it is highly disadvantageous to operate, because one must partially disassemble it to make the adjustment.

SUMMARY OF THE INVENTION

An object of the present invention is to provide an economical, effective, reliable apparatus for dispensing powdered and granulated materials, such as insecticides, fertilizers, and the like.

A further object of the invention is to provide an apparatus in which the concentration of the air/material mixture is easily adjustable during use, a feature not found in prior art constructions.

The foregoing and other objects are achieved in a first embodiment of the invention which includes a container having a tight-fitting, removable top. The intake of a conventional blower is attached to a container outlet tube which extends through the container top. An L-shaped air inlet tube includes a first end connected to a first air inlet orifice in the container wall adjacent to the container top and a second end adjacent to the container bottom. A second air inlet orifice is disposed in the container wall substantially opposite the first air inlet orifice. Finally, first and second slidable air control doors are arranged to vary the size of their respective air inlet orifices.

Prior to operating the apparatus, the container is filled to a maximum of 75-80% of its capacity with the desired powdered or granulated material. Assuming both air control doors are positioned so that their respective orifices are at least partially open, when the blower is operated at low speed, air is drawn into the interior of the container through only the second air inlet orifice. As the air flow above the material is quite turbulent, the air picks up material, then flows into the container outlet tube, through into the blower inlet, through the blower, and out from the blower discharge nozzle.

When the blower is operated at high speed, air is drawn into the container's interior through the second air inlet orifice and through the air inlet tube. The air which flows through the air inlet tube exits adjacent to the bottom of the container. As the air inlet tube air flows upwardly through the material in the container, it picks up material. This air/material mixture combines with the mixture of second air inlet orifice air and material above the material. The combined mixtures then flow out of the container through the container outlet tube.

The concentration of the air/material mixture discharged from the blower can be easily controlled by varying the speed of the blower and the relative sizes of the air inlet orifices.

A second embodiment of the invention also provides a container and a tightly-fitting, removable container top. The intake of a conventional blower is connected to a container outlet fitting which passes through the container top. A container outlet tube extends from a reducing flange in the container outlet fitting to near the bottom of the container. A plurality of openings in the container outlet tube near the bottom of the container allows material within the container to flow into the container outlet tube with air passing through the material.

When the blower is operated, air flows into the container through a container air intake orifice in the wall of the container. The size of the air intake orifice is varied by adjusting a second slidable air control door.

After entering the container, the air intake orifice air flows downwardly through a pair of air tubes attached to the container outlet tube, then exits the air tubes near the bottom of the container. The air then flows through the material between the lower ends of the air tubes and the openings in the container outlet tube, thereby picking up material, and then into the container outlet tube through the openings. The air/material mixture then flows upwardly through the container outlet tube, then through the container outlet fitting and into the blower intake.

The first end of a container air intake tube is connected to a container air intake tube in the wall of the container and the second end of the container air intake tube is connected to the container outlet tube. The size of the air intake tube orifice is varied with a first slidable air control door. Air flowing through the air intake tube does not pass through the material within the container. Rather, it acts to dilute the air/material mixture which entered the container outlet tube through the openings in the lower end of the container outlet tube.

By adjusting the speed of the blower and the relative sizes of the container air intake tube orifice and the container air intake orifice, the volume and concentration of the air/material mixture discharged from the blower discharge nozzle and the distance the mixture travels after being discharged can be easily varied over a broad range.

Both of the described embodiments of the invention provide an economical, reliable, effective apparatus for dispensing powdered or granulated materials. Unlike the prior art devices discussed above, the concentration of the material/air mixture discharged from an apparatus constructed in accordance with the present invention is easily adjusted, even when the apparatus is in operation.

BRIEF DESCRIPTION OF THE DRAWINGS

Two embodiments of the invention will be described, by way of example only, with reference to the accompanying drawings, in which:

FIG. 1 is a cutaway side view of a first embodiment of the invention;

FIG. 2 is a cutaway side view of a second embodiment of the invention; and

FIG. 3 is a top view of the container outlet tube taken through plane 3—3 in FIG. 2.

DETAILED DESCRIPTION

FIG. 1 illustrates an apparatus 1 which is used to dispense powdered and granular materials, such as insecticides, fertilizers, and the like. The apparatus 1 includes a conventional blower 3, such as a leaf blower, and a container 5 having a tight-fitting, removable container top 7. The blower 3 comprises an intake 9, a blower discharge nozzle 11, and a centrifugal pump 13 powered by a gasoline engine or an electric motor (not shown). When operating, the blower 3 draws air in through the blower intake 9 and discharges it under pressure through the blower discharge nozzle 11.

The blower intake 9 is removably attached to a container outlet tube 15. The container outlet tube 15 passes through and is sealed to the container top 7. It will be appreciated by those skilled in the art that the blower intake 9 could be permanently connected to the container outlet tube 15. In addition, the blower 3, container outlet tube 15, and container top 7 could be constructed as an integral unit.

One end of an L-shaped container air inlet tube 17 is connected to a first air inlet orifice 19 in a container wall 21 adjacent to the container top 7. The container air inlet tube 17 extends downwardly within the container 5 and is positioned with its free end just above the container bottom 23.

A first air control door 25 is slidably attached to the container wall 21 by opposed channels 27, only one of which is shown. The first air control door 25 is used to vary the size of the first air inlet orifice 19.

A second air inlet orifice 29 in the container wall 21 is positioned opposite the first air inlet orifice 19. A second air control door 31 is slidably attached to the container wall 21 by opposed channels 33, only one of which is shown. The second slidable air control door 31 is used to vary the size of the second air inlet orifice 29.

Before operating the apparatus 1, the container 5 is filled to approximately 75–80% of its capacity with a powdered or granulated material 35. Assuming the slidable air control doors 25, 31 are positioned so that both the air inlet orifices 19, 29 are at least partially open, when the blower 3 is operated at low speed, the suction created in the container 5 is not sufficient to draw air through the container air inlet tube 17 and the material 35. As a result, at low blower speeds, air is drawn into the container 5 through the second air inlet orifice 29.

The air flow inside the container 5 above the material 35 is quite turbulent. As a result, the air picks up material 35. The air/material mixture flows through the container outlet tube 15, into the blower intake 9, through the centrifugal pump 13, then out of the blower discharge nozzle 11.

At higher blower speeds, the suction created in the container 5 is sufficient to draw air into the container 5 through the first air inlet orifice 19 and the container air inlet tube 17. The air from the container air inlet tube 17 picks up material 35 as it flows upwardly therethrough. This additional air/material mixture enters the turbulent air/material mixture above the material 35.

The volume and concentration of the air/material mixture discharged from the blower discharge nozzle 11 can easily be controlled by adjusting the speed of the blower 3 and the relative sizes of the air inlet orifices 19, 29. As a result, the apparatus 1 shown in FIG. 1 provides a simple, reliable, inexpensive, and effective means to dispense powdered and granular materials.

It will be appreciated by those skilled in the art that in an alternative form of the embodiment shown in FIG. 1, the second air inlet orifice 29 and the second slidable air control door 31 could be omitted.

FIGS. 2 and 3 illustrate a second embodiment of the invention. Once again, an apparatus 101 comprises a conventional blower 103, such as a leaf blower, and a container 105 which includes a tightly-fitting, removable container top 107. A centrally-located container outlet tube 109 extends from near the container bottom 111 to a reducing flange 113 within a container outlet fitting 115 in the container top 107. A plurality of container outlet tube openings 117 are provided in the container outlet tube 109 adjacent to the container bottom 111. In use, powdered or granulated material 119 is placed in the container 105. When the blower 103 is operated, a mixture of air and material 119 flows into the container outlet tube 109 through the container outlet tube openings 117 then flows upwardly into the blower 103 through the container outlet fitting 115.

One end of a horizontal container air intake tube 121 is connected to the container outlet tube 109 and the other end of the container air intake tube 121 is connected to a container air intake tube orifice 123 in the container wall 125. A first air control door 127 is slidably attached to the container wall 125 by two channels 129, only one of which is shown. The slidable first air control door 127 is used to vary the size of the container air intake tube orifice 123.

A container air intake orifice 131 in the container wall 125 is positioned approximately opposite the container air intake tube orifice 123. A second air control door 133 is slidably attached to the container wall 125 by channels 135, only one of which is shown. The second slidable air control door 133 is used to vary the size of the container air intake orifice 131.

Two air tubes 137 (only one of which is shown in FIG. 2) extend downwardly from an upper air tube end 141 near the container top 107 to a lower air tube end 143 near the container bottom 111. The air tubes 137 allow air entering the container 105 through the container air intake orifice 131 to easily flow downwardly to near the container bottom 111.

In this embodiment, the intake blower 145 is removably connected to the top of the container outlet fitting 115. Those skilled in the art will appreciate that the blower intake 145 could be permanently attached to the container outlet fitting 115 or made integral therewith.

Assuming the slidable air control doors 127, 133 are positioned so that both the container air intake tube orifice 123 and the container air intake orifice 131 are at least partially open, when the blower 103 is operated, air from both of the orifices 123, 131 is drawn into the container outlet tube 109. Air entering container air intake orifice 131 passes through the air tubes 137, through the material 119 near the container bottom 111, and into the container outlet tube 109 through the container outlet tube openings 117. As the air from the container air intake orifice 131 passes through the material 119 adjacent to container outlet tube openings 117 in the bottom of the container outlet tube 109, it picks up material 119. Air entering the container air intake tube orifice 123 flows through the container air intake tube 121 and into the container outlet tube 109, where it mixes with the air/material mixture which entered the container outlet tube 109 through the container outlet tube openings 117. The air/material mixture in the container outlet tube 109 then flows into the blower intake 145, through the blower 103, and out of the blower discharge nozzle 147 undo pressure.

It will be appreciated that the air entering the container outlet tube 109 from the container air intake tube 121 does not pass through the material 119. As a result, this container air intake tube air acts to dilute the air/material mixture in the container outlet tube 109. Also, because the container air intake tube air meets with less flow resistance than the air which flows through the container air intake orifice 131, air tubes 137, material 119, and container outlet tube openings 117, positioning the first air control door 127 lo increase the size of the container air intake tube orifice 123 increases the distance the air/material mixture travels after being discharged from the blower discharge nozzle 147. By adjusting the speed of the blower motor and the relative sizes of the container air intake tube orifice 123 and the container air intake orifice 131, the volume and concentration of the air/material mixture discharged and the distance the mixture travels after being discharged can easily controlled over a broad range.

While the preferred embodiment of the invention has been shown and described, it will be apparent to those skilled in this art that various modifications may be made to this embodiment without departing from the spirit of the present invention.

I claim:

1. An apparatus for dispersing powdered and granulated materials comprising:

(a) a container including a wall, a bottom, and a top defining an interior thereof, and suitable for containing a powdered and granulated material;

(b) an outlet tube disposed in the interior of the container, the outlet tube including first and second ends; the first outlet tube end being disposed adjacent to the container bottom; the second outlet tube end being connected to an outlet orifice for the container;

(c) at least one air inlet tube in fluid communication with the second end of the outlet tube and a first air inlet orifice for the container (d) a second air inlet orifice for the container; and (e) a blower coupled to the outlet orifice for the container such that when the blower blows air across the outlet orifice, air enters the container through the second air inlet and filters through and entrains the material before entering the outlet tube where it is mixed with air drawn through the first air inlet orifice.

2. The apparatus of claim 1 further comprising means for varying the area of at least one of the first and second air inlet orifices.

3. The apparatus of claim 2 wherein the means for varying said at least one area comprises at least one slidable door disposed to allow said door to cover a variable portion of said at least one air inlet orifice.

* * * * *

UNITED STATES PATENT AND TRADEMARK OFFICE
CERTIFICATE OF CORRECTION

PATENT NO. : 5,779,161
DATED : Jul. 14, 1998
INVENTOR(S) : Tom Rudy Dvorak

It is certified that error appears in the above-indentified patent and that said Letters Patent is hereby corrected as shown below:

Column 5, Line 25, "undo" should be --under--.

Column 5, Line 35, "lo" should be --to--.

Signed and Sealed this

Fifth Day of October, 1999

Attest:

Q. TODD DICKINSON

*Attesting Officer*     *Acting Commissioner of Patents and Trademarks*